(12) United States Patent
Vincent et al.

(10) Patent No.: US 11,459,894 B1
(45) Date of Patent: Oct. 4, 2022

(54) GAS TURBINE ENGINE AIRFOIL FAIRING WITH RIB HAVING RADIAL NOTCH

(71) Applicant: RAYTHEON TECHNOLOGIES CORPORATION, Farmington, CT (US)

(72) Inventors: Tyler G. Vincent, Portland, CT (US); Chang Gao, West Hartford, CT (US); Bryan P. Dube, Columbia, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 17/197,140

(22) Filed: Mar. 10, 2021

(51) Int. Cl.
  *F01D 5/14* (2006.01)
  *F01D 5/18* (2006.01)
  *F01D 5/28* (2006.01)

(52) U.S. Cl.
  CPC ............ *F01D 5/147* (2013.01); *F01D 5/189* (2013.01); *F01D 5/282* (2013.01); *F05D 2220/36* (2013.01); *F05D 2240/122* (2013.01); *F05D 2240/80* (2013.01); *F05D 2260/22141* (2013.01); *F05D 2300/6033* (2013.01)

(58) Field of Classification Search
  CPC .......... F01D 5/147; F01D 5/189; F01D 5/282; F01D 5/18; F01D 5/187; F01D 5/188; F01D 5/284; F01D 9/06; F01D 9/065; F05D 2220/36; F05D 2240/122; F05D 2240/80; F05D 2260/22141; F05D 2300/6033; F05D 2240/126; F05D 2260/20; F05D 2260/941; F05D 2300/603
  See application file for complete search history.

(56) References Cited

U.S. PATENT DOCUMENTS

| 6,375,415 | B1* | 4/2002 | Burdgick | F01D 25/246 |
| | | | | 415/114 |
| 10,287,892 | B2 | 5/2019 | Ahmad et al. | |
| 10,472,970 | B2* | 11/2019 | Simpson | F23R 3/002 |
| 10,808,547 | B2 | 10/2020 | Lessard et al. | |
| 2018/0179906 | A1* | 6/2018 | Schetzel | F01D 5/282 |
| 2018/0298764 | A1 | 10/2018 | Ahmad et al. | |
| 2019/0032493 | A1* | 1/2019 | Barker | F01D 9/042 |

OTHER PUBLICATIONS

Floreen, S., Fuchs, G.E., and Yang, W.J. (1994). The metallurgy of alloy 625. The Minerals, Metals, & Materials Society. 1994. pp. 13-37.

* cited by examiner

*Primary Examiner* — Woody A Lee, Jr.
*Assistant Examiner* — Eric A Lange
(74) *Attorney, Agent, or Firm* — Carlson, Gaskey & Olds, P.C.

(57) ABSTRACT

An airfoil fairing includes an airfoil section that is formed of a fiber-reinforced composite wall. The airfoil section has first and second radial ends, pressure and suction sides, leading and trailing ends that join the pressure and suction sides, an internal cavity, and a rib that extends radially in the internal cavity. The rib has a radial rib end at the first radial end of the airfoil section and extends across the internal cavity from a first rib side at the pressure side to a second rib side at the suction side. The rib defines at the radial end first and second shoulders. The first and second shoulders define a radial notch there between.

21 Claims, 3 Drawing Sheets

GAS TURBINE ENGINE AIRFOIL FAIRING WITH RIB HAVING RADIAL NOTCH

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

An airfoil fairing according to an example of the present disclosure includes an airfoil section formed of a fiber-reinforced composite wall. The airfoil section has first and second radial ends, pressure and suction sides, leading and trailing ends joining the pressure and suction sides, an internal cavity, and a rib extending radially in the internal cavity. The rib has a radial rib end at the first radial end of the airfoil section and extends across the internal cavity from a first rib side at the pressure side to a second rib side at the suction side. The rib defines first and second shoulders at the radial end. The first and second shoulders define a radial notch there between.

In a further embodiment of any of the foregoing embodiments, the rib has another radial rib end at the second radial end of the airfoil section. The rib defines a radial rib span between a shoulder apex of one of the first or second shoulders and the radial rib end at the second radial end of the airfoil section. The radial notch defines a radial notch span between the shoulder apex and a radial nadir of the radial notch, and the radial notch span is 1% to 10% of the radial rib span.

In a further embodiment of any of the foregoing embodiments, the rib at the radial rib end defines a lateral rib span between the pressure and suction sides of the airfoil section. The radial notch defines a lateral notch span between shoulder apexes of the first and second shoulders, and the lateral notch span is 40% to 70% of the lateral rib span.

In a further embodiment of any of the foregoing embodiments, the rib has another radial rib end at the second radial end of the airfoil section. The first and second shoulders defines shoulder apexes. The rib defines a radial rib span between one of the shoulder apexes and the radial rib end at the second radial end of the airfoil section. The radial notch defines a radial notch span between the one of the shoulder apexes and a radial nadir of the radial notch. The rib at the radial rib end defines a lateral rib span between the pressure and suction sides of the airfoil section. The radial notch defines a lateral notch span between the shoulder apexes of the first and second shoulders, and the lateral notch span is greater than the radial notch span.

In a further embodiment of any of the foregoing embodiments, the radial notch has a radial nadir and curved sides that extend from the radial nadir.

In a further embodiment of any of the foregoing embodiments, the radial notch has a cross-section that is substantially a hyperbola.

In a further embodiment of any of the foregoing embodiments, the airfoil fairing has first and second fairing platforms also formed by the fiber-reinforced composite wall, and the airfoil section extends between the first and second fairing platforms.

In a further embodiment of any of the foregoing embodiments, the fiber-reinforced composite wall is ceramic matrix composite.

A gas turbine engine according to an example of the present disclosure includes a compressor section, a combustor in fluid communication with the compressor section, and a turbine section in fluid communication with the combustor. The turbine section has vanes disposed about a central axis of the gas turbine engine. Each of the vanes includes an airfoil fairing that has an airfoil section formed of a fiber-reinforced composite wall. The airfoil section has first and second radial ends, pressure and suction sides, leading and trailing ends joining the pressure and suction sides, an internal cavity, and a rib extending radially in the internal cavity. The rib has a radial rib end at the first radial end of the airfoil section and extending across the internal cavity from a first rib side at the pressure side to a second rib side at the suction side. The rib defines first and second shoulders at the radial end. The first and second shoulders define a radial notch there between.

In a further embodiment of any of the foregoing embodiments, the rib has another radial rib end at the second radial end of the airfoil section. The rib defines a radial rib span between a shoulder apex of one of the first or second shoulders and the radial rib end at the second radial end of the airfoil section. The radial notch defines a radial notch span between the shoulder apex and a radial nadir of the radial notch, and the radial notch span is 1% to 10% of the radial rib span.

In a further embodiment of any of the foregoing embodiments, the rib at the radial rib end defines a lateral rib span between the pressure and suction sides of the airfoil section. The radial notch defines a lateral notch span between shoulder apexes of the first and second shoulders, and the lateral notch span is 40% to 70% of the lateral rib span.

In a further embodiment of any of the foregoing embodiments, the rib has another radial rib end at the second radial end of the airfoil section. The first and second shoulders defines shoulder apexes. The rib defines a radial rib span between one of the shoulder apexes and the radial rib end at the second radial end of the airfoil section. The radial notch defines a radial notch span between the one of the shoulder apexes and a radial nadir of the radial notch. The rib at the radial rib end defines a lateral rib span between the pressure and suction sides of the airfoil section. The radial notch defines a lateral notch span between the shoulder apexes of the first and second shoulders, and the lateral notch span is greater than the radial notch span.

In a further embodiment of any of the foregoing embodiments, the radial notch has a radial nadir and curved sides that extend from the radial nadir.

In a further embodiment of any of the foregoing embodiments, the radial notch has a cross-section that is substantially a hyperbola.

In a further embodiment of any of the foregoing embodiments, the airfoil fairing has first and second fairing platforms also formed by the fiber-reinforced composite wall, and the airfoil section extends between the first and second fairing platforms.

In a further embodiment of any of the foregoing embodiments, the fiber-reinforced composite wall is ceramic matrix composite.

In a further embodiment of any of the foregoing embodiments, an aspect ratio of the lateral notch span to the radial rib span is from 1:1 to 4:1.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
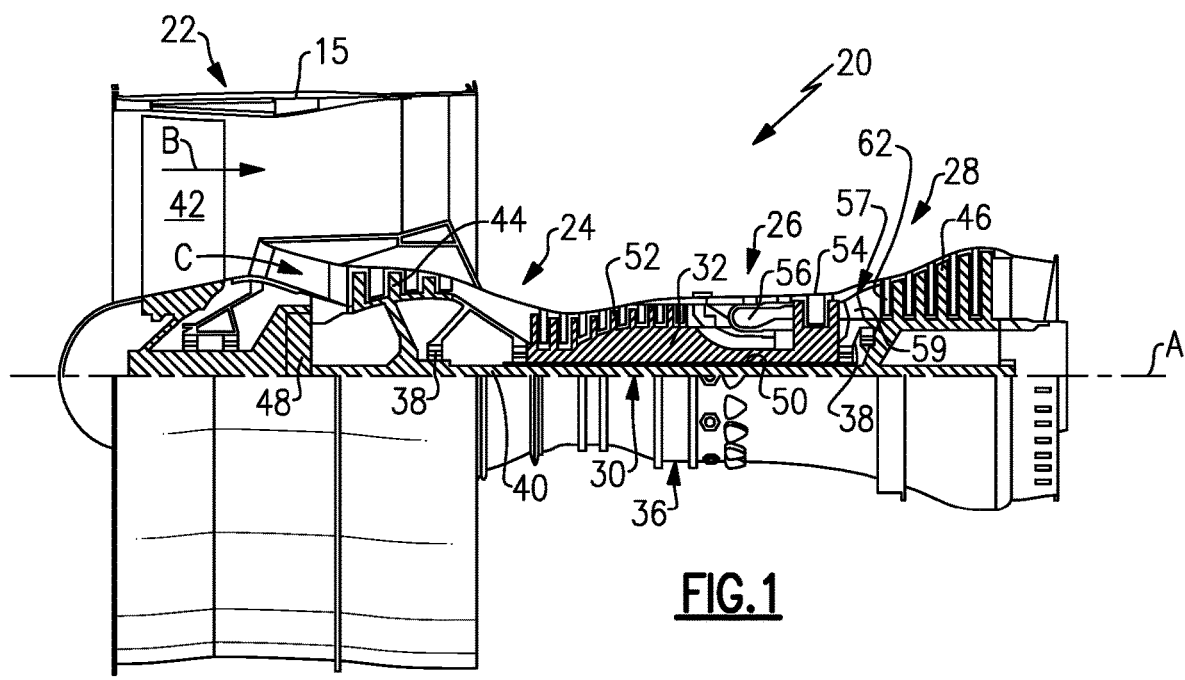
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
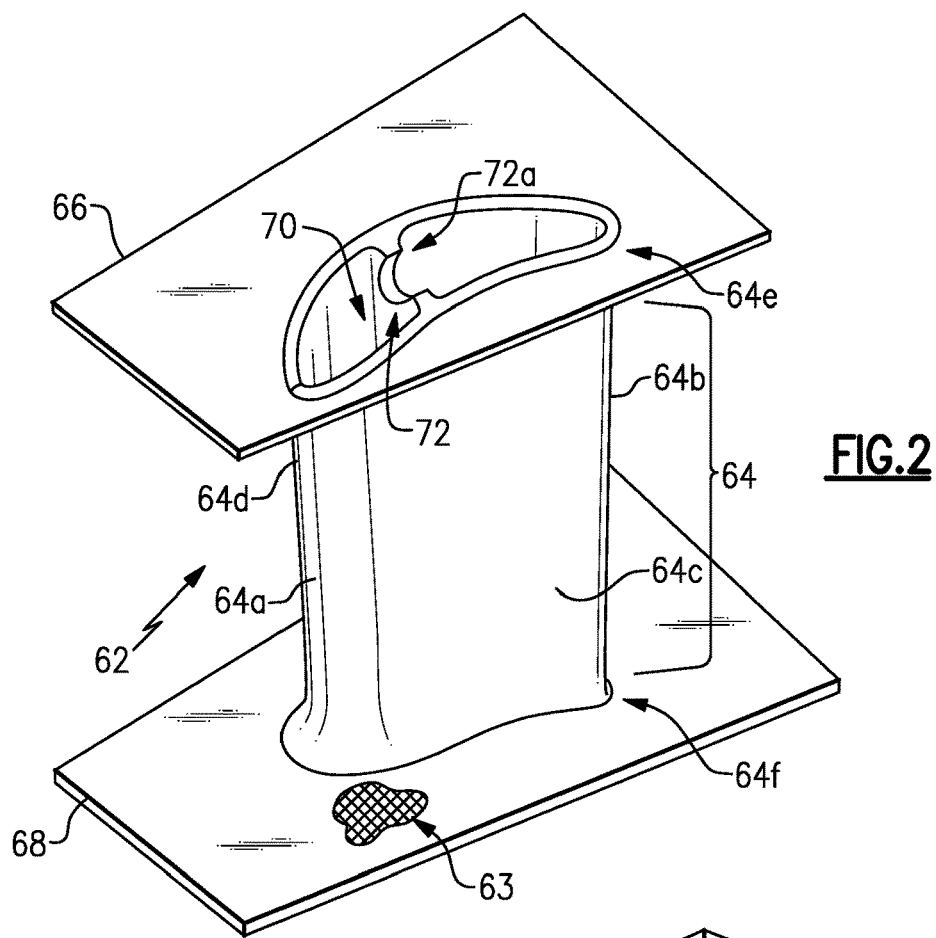
FIG. 2 illustrates and airfoil fairing of the turbine engine.
Figure 3:
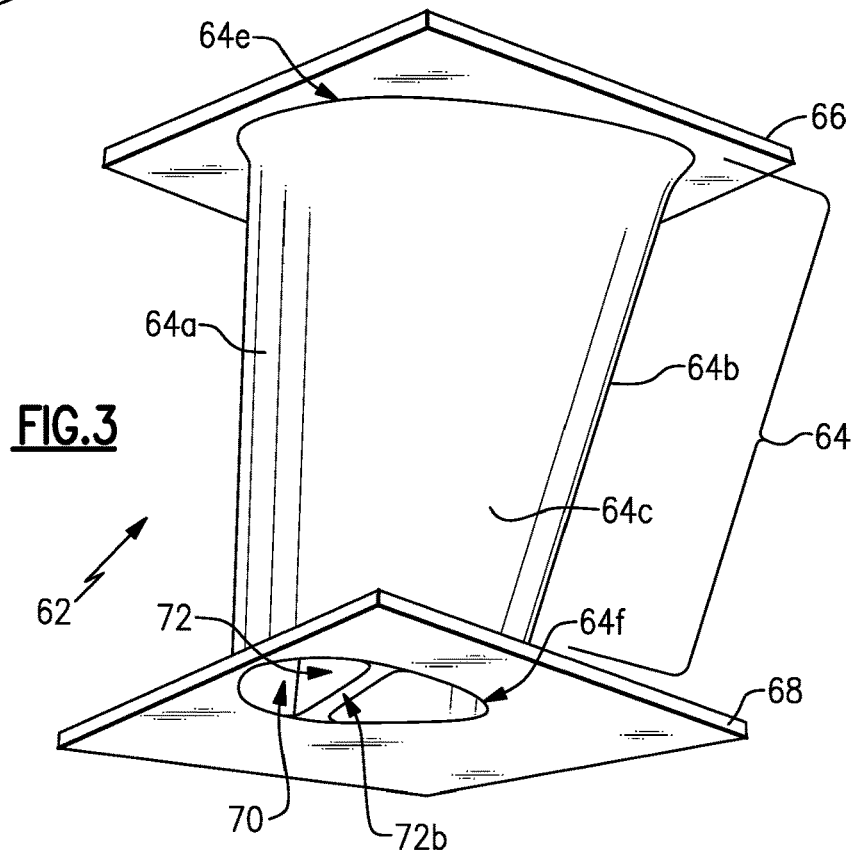
FIG. 3 illustrates another view of the airfoil fairing.

FIGS. 2 and 3 illustrate isometric views of an example airfoil fairing 62 from the turbine section 28 of the engine 20 (see also FIG. 1). For instance, the airfoil fairing 62 is supported between inner and outer support hardware and there are multiple airfoil fairings 62 arranged in a circumferential row in the engine 20. It is to be understood that although the examples herein are in context of a vane from the turbine section, the examples can be applied to vanes in other portions of the engine 20.

The airfoil fairing 62 is formed by a fiber-reinforced composite airfoil wall 63 (shown in partial cutaway view). For example, the fiber-reinforced composite is a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum. The fiber tows are arranged in a fiber architecture, which refers to an ordered arrangement of the tows relative to one another, such as a 2D woven ply or a 3D structure.

Figure 4:
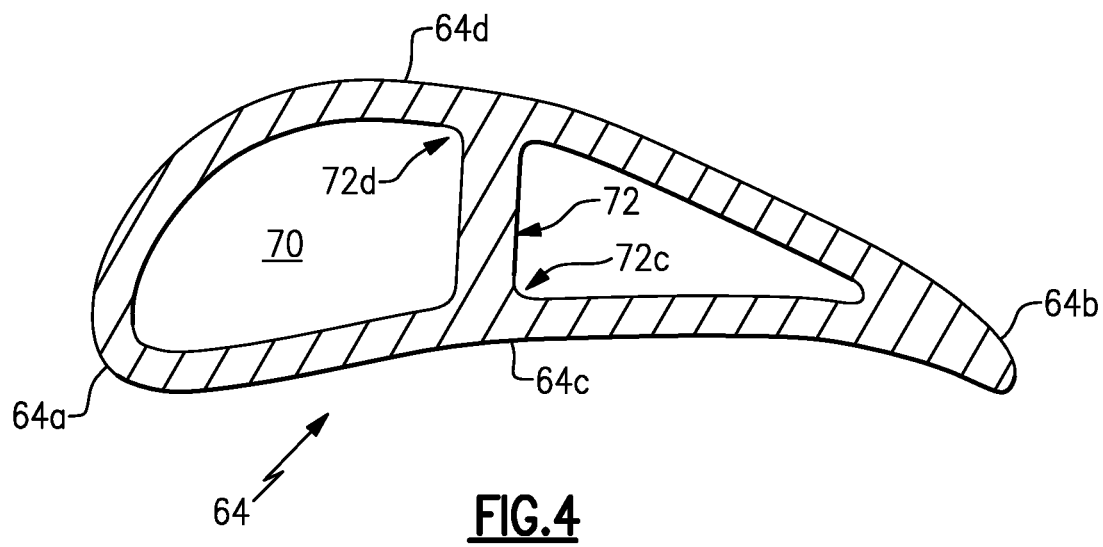
FIG. 4 illustrates a sectioned view of an airfoil fairing.

In the illustrated example, the airfoil fairing 62 is comprised of a hollow airfoil section 64 (also shown in cross-section in FIG. 4) and first and second platforms 66/68 between which the airfoil section 64 extends. The airfoil section 64 defines leading and trailing ends 64a/64b and first and second sides 64c/64d that join the leading and trailing ends 64a/64b. In this example, the first side 64c is a pressure side and the second side 64d is a suction side. The airfoil section 64 spans radially between a first (outer) radial end 64e to a second (inner) radial end 64f.

In the illustrated example the airfoil section 64 and platforms 66/68 are integral in that the airfoil fairing 62 is a unitary piece formed of the airfoil wall 63. Alternatively, the airfoil section 64 and one or both of the platforms 66/68 may be provided as separate pieces. The airfoil section 64 generally extends in a radial direction relative to the central engine axis A. The terms such as "inner" and "outer" refer to location with respect to the central engine axis A, i.e., radially inner or radially outer. Moreover, the terminology "first" and "second" as used herein is to differentiate that there are two architecturally distinct components or features. It is to be further understood that the terms "first" and "second" are interchangeable in the embodiments herein in that a first component or feature could alternatively be termed as the second component or feature, and vice versa.

The airfoil section 64 circumscribes an internal cavity 70 and includes a rib 72 that sub-divides the cavity 72 into a forward sub-cavity and an aft sub-cavity. As will be appreciated, the airfoil section 64 may include one or more additional ribs 72 according to the examples herein and that further sub-divide the cavity 70. The rib 72 is also formed, fully or in part, of the fiber-reinforced composite. Alternatively, the rib 72 may have one or more skin layers of fiber-reinforced composite around a core insert. For example, the core insert is a monolithic material, such as a monolithic ceramic (e.g., SiC).

The rib 72 is generally elongated in the radial direction. In this regard, the rib 72 has a first radial rib end 72a at the first radial end 64e of the airfoil section 64 and a second radial rib end 72b at the second radial end 64e of the airfoil section 64. In the direction lateral (perpendicular) to the radial direction, the rib 72 extends across the cavity 70 from a first rib side 72c at the first side 64c of the airfoil section 64 to the second rib side 72d at the second side 64d of the airfoil section 64.

In general, the fiber-reinforced composite of which the airfoil fairing 62 is formed has significantly lower thermal conductivity than superalloys and does not possess the same strength and ductility characteristics, making it more susceptible to distress from thermal gradients and the thermally induced stresses those cause. The high strength and toughness of superalloys permits resistance to thermal stresses, whereas by comparison materials such as ceramics are more prone to distress from thermal stress. Thermal stresses may cause distress at relatively weak locations, such as interlaminar interfaces between fiber plies where there are no fibers carrying load and/or at fillets between wall sections. Therefore, although maximized cooling may be desirable for superalloy vanes, cooling in some locations for non-superalloy vanes may exacerbate thermal gradients and thus be counter-productive to meeting durability goals.

In general, cooling air may be introduced into the internal cavity of an airfoil fairing from one of the radial ends of the fairing (e.g., through the outer platform). The region of the radial end, including support hardware at that end, may thus be at a relatively cool temperature in comparison to portions of the airfoil fairing that are exposed in the core gas path. However, as the fiber-reinforced composite has relatively low thermal conductivity, the cooling air, the relatively cool hardware, or both may contribute to a radial thermal gradient in the airfoil fairing, and particularly in ribs that span cross the cavity. Such thermal gradients may induce thermal stresses in the rib and rib fillets where it connects to the suction and pressure side walls. In this regard, as will be discussed in further detail below, the rib 72 according to examples herein includes a radial notch to facilitate mitigation of thermal gradients and the induced thermal stresses.

Figure 5:
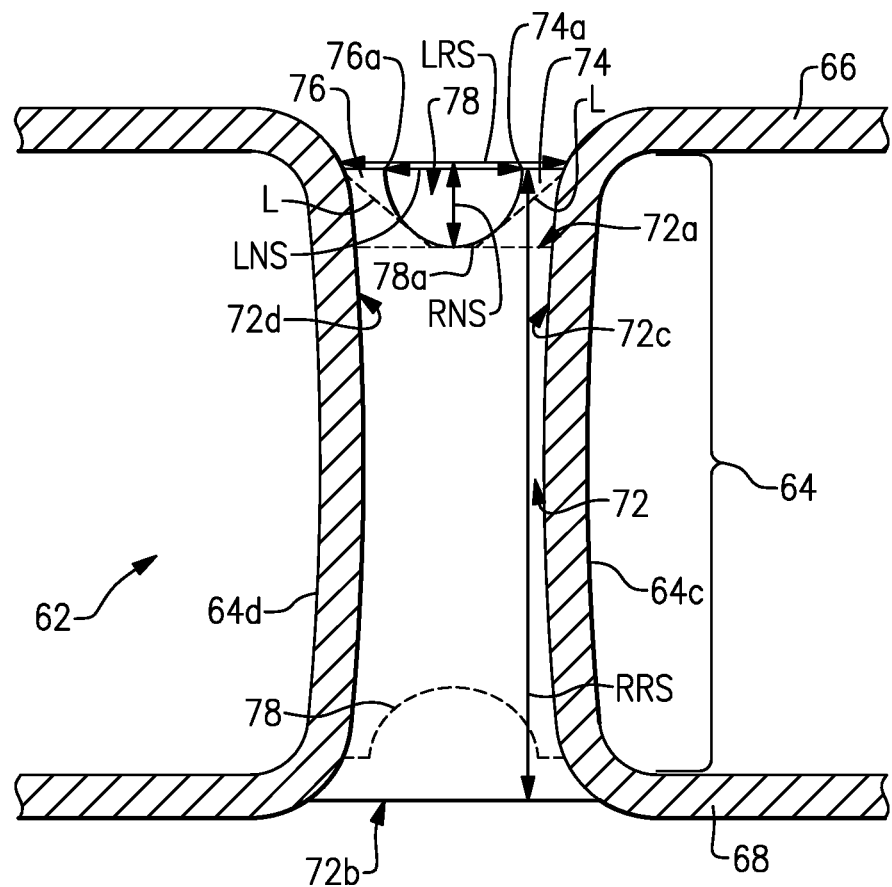
FIG. 5 illustrates another sectioned view of an airfoil fairing.

FIG. 5 illustrates a portion of the airfoil fairing 62 radially sectioned forward of the rib 72 (looking aft). As shown, the rib 72 defines first and second shoulders 74/76 at the radial end 72a. The shoulders 74/76 are attached at their outer lateral margins to the sides 64c/64d of the airfoil section 64. The inner lateral edges of the shoulders 74/76 define the border of a radial notch 78 there between. In this example, the notch 78 has a radial nadir 78a and curved sides that extend from the radial nadir 78a to respective apexes 74a/76a of the shoulders 74/76 that delimit the endpoints of the notch 78. The notch 78 is formed in the rib 72 by machining, cutting, or the like, but may alternatively be formed during the processing of the fiber-reinforced composite (e.g., during layup of fiber plies).

In the illustrated example, the apexes 74a/76a are relatively pronounced corners. Alternatively, however, the shoulders 74/76 may be rounded such that the apexes 74a/76a are less pronounced. In either case, the apexes 74a/76a may be defined as the points on the shoulders 74/76 that are the farthest perpendicular distance from respective lines L that intersect the rib fillet of the shoulder 74/76 at the respective side 64c/64d and that are tangent to the side of the notch 78.

The notch 78 is generally in the lateral middle region of the rib 72. As discussed above, the region of the radial end of the airfoil fairing 62 may be relatively cool in temperature. Thus, the radial end of the rib 72 is relatively cool. And although the lateral sides of the rib 72 may be heated via the sides 64c/64d, the lateral middle region of the rib 72 remains relatively cool due to low thermal conductivity of the fiber-reinforced composite. In this regard, the notch 78 is open (void) and thus serves to reduce the thermal mass of the rib 72 (in comparison to a full rib without the notch 78). The region of the notch 78 would otherwise be relatively cool. However, the presence of the notch 78 eliminates this relatively cold thermal mass region, thereby facilitating a reduction in thermal gradient in the shoulders 74/76 and vicinity of the first end 72a of the rib 72 and a corresponding reduction in thermal stress at the fillets between the rib 72 and the sides 64c/64d. Additionally, the notch 78 may facilitate a local reduction in stiffness of the rib 72, thereby further reducing stresses at the rib fillets. It is to be understood that although the notch 78 is at the first end 72a of the rib 72 (the outer diameter), the second end 72b (the inner diameter) of the rib 72 may additionally or alternatively have a notch 78 (as shown in dashed lines in FIG. 5).

In further examples, the notch 78 is geometrically configured to further facilitate reduction in thermal gradients. For instance, the rib 72 defines a lateral rib span LRS between the pressure and suction sides 64a/64b of the airfoil section 64 (taken at the top of the shoulders 74/76. The notch 78 defines a lateral notch span LNS between the shoulder apexes 74a/76a. The the lateral notch span LNS is 40% to 70% of the lateral rib span LRS. At 40% and above, the notch 78 accounts for a substantial lateral extent of the rib 72 to facilitate thermal gradient reduction. Up to 70%, the notch 78 accounts for a greater lateral extent of the rib 72 to further facilitate thermal gradient reduction, yet margins remain between the notch 78 and the fillets between the shoulders 74/76 and the sides 64c/64d. Such margins ensure that the notch 78 does not impinge into the fillets.

In additional examples, the rib 72 also defines a radial rib span RRS between one of the shoulder apexes 74a/76a (the outermost one if the apexes 74/76a are not radially aligned, or either one if they are radially aligned) and the second rib end 72b. The notch 78 defines a radial notch span RNS (notch depth) that is the radial distance between the same radial shoulder apex 74a or 76a and a radial nadir 78a of the notch 78. The radial notch span RNS is 1% to 10% of the radial rib span RRS. In a further example, the radial notch span RNS is at least 5% of the radial rib span RRS. Although the notch 78 may account for a substantial lateral extent of the rib 72, as discussed above, the notch 78 need not account for a substantial radial extent of the rib 72. For instance, in order to facilitate mitigation of thermal gradients in the fillet from the airfoil section 64 to the platform 66, the notch depth may be 10% or less depending on the size of the fillet. However, at least below 5% and especially below about 1%, the reductions in thermal gradient may be minimal. In general, however, the lateral notch span LNS is at least 40% and an aspect ratio of the LNS to the RRS (in millimeters) is from 1:1 to 4:1. In one additional example, the notch 78 has a cross-section that is substantially a hyperbola. In an additional example, one or both of the shoulders are excluded such that the notch 78 extends to one or both of the sides 64c/64d.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil fairing comprising:
an airfoil section formed of a fiber-reinforced composite wall, the airfoil section having first and second radial ends, pressure and suction sides, leading and trailing ends joining the pressure and suction sides, an internal cavity, and a rib extending radially in the internal cavity, the rib having a radial rib end at the first radial end of the airfoil section and extending across the internal cavity from a first rib side at the pressure side to a second rib side at the suction side, the rib defining at the radial end first and second shoulders, the first and second shoulders defining a radial notch there between, each of the first and second shoulders having an apex defined at a farthest perpendicular distance from a reference line that intersects the respective first or second shoulder at the pressure side or the suction side and that is tangent to the radial notch, the radial notch defined between the apex of the first shoulder and the apex of the second shoulder.

2. The airfoil fairing as recited in claim 1, wherein the rib has another radial rib end at the second radial end of the airfoil section, the rib defines a radial rib span between a shoulder apex of one of the first or second shoulders and the radial rib end at the second radial end of the airfoil section, the radial notch defines a radial notch span between the shoulder apex and a radial nadir of the radial notch, and the radial notch span is 1% to 10% of the radial rib span.

3. The airfoil fairing as recited in claim 1, wherein the rib at the radial rib end defines a lateral rib span between the pressure and suction sides of the airfoil section, the radial notch defines a lateral notch span between shoulder apexes of the first and second shoulders, and the lateral notch span is 40% to 70% of the lateral rib span.

4. The airfoil fairing as recited in claim 1, wherein the rib has another radial rib end at the second radial end of the airfoil section, the first and second shoulders defines shoulder apexes, the rib defines a radial rib span between one of the shoulder apexes and the radial rib end at the second radial end of the airfoil section, the radial notch defines a radial notch span between the one of the shoulder apexes and a radial nadir of the radial notch, the rib at the radial rib end defines a lateral rib span between the pressure and suction sides of the airfoil section, the radial notch defines a lateral notch span between the shoulder apexes of the first and second shoulders, and the lateral notch span is greater than the radial notch span.

5. The airfoil fairing as recited in claim 1, wherein the radial notch has a radial nadir and curved sides that extend from the radial nadir.

6. The airfoil fairing as recited in claim 1, wherein the radial notch has a cross-section that is substantially a hyperbola.

7. The airfoil fairing as recited in claim 1, wherein the airfoil fairing has first and second fairing platforms also formed by the fiber-reinforced composite wall, and the airfoil section extends between the first and second fairing platforms.

8. The airfoil fairing as recited in claim 7, wherein the fiber-reinforced composite wall is ceramic matrix composite.

9. The airfoil fairing as recited in claim 1, wherein the rib has another radial rib end at the second radial end of the airfoil section, the rib defines a radial rib span between a shoulder apex of one of the first or second shoulders and the radial rib end at the second radial end of the airfoil section, the radial notch defines a radial notch span between the shoulder apex and a radial nadir of the radial notch, the radial notch span is 1% to 10% of the radial rib span, the rib at the radial rib end defines a lateral rib span between the pressure and suction sides of the airfoil section, the radial notch defines a lateral notch span between shoulder apexes of the first and second shoulders, and the lateral notch span is 40% to 70% of the lateral rib span.

10. The airfoil fairing as recited in claim 1, wherein the rib has another radial rib end at the second radial end of the airfoil section, the rib defines a radial rib span between a shoulder apex of one of the first or second shoulders and the radial rib end at the second radial end of the airfoil section, the rib at the radial rib end defines a lateral rib span between the pressure and suction sides of the airfoil section, the radial notch defines a lateral notch span between shoulder apexes of the first and second shoulders, and an aspect ratio of the lateral notch span to the radial rib span is from 1:1 to 4:1.

11. The airfoil fairing as recited in claim 1, wherein the apex is between a point where the reference line intersects the respective first or second shoulder at the pressure side or the suction side and a point where the line is tangent to the radial notch.

12. A gas turbine engine comprising:
a compressor section;
a combustor in fluid communication with the compressor section; and
a turbine section in fluid communication with the combustor, the turbine section having vanes disposed about a central axis of the gas turbine engine, each of the vanes includes:
an airfoil fairing including an airfoil section formed of a fiber-reinforced composite wall, the airfoil section having first and second radial ends, pressure and suction sides, leading and trailing ends joining the pressure and suction sides, an internal cavity, and a rib extending radially in the internal cavity, the rib having a radial rib end at the first radial end of the airfoil section and extending across the internal cavity from a first rib side at the pressure side to a second rib side at the suction side, the rib defining at the radial end first and second shoulders, the first and second shoulders defining a radial notch there between, the rib at the radial rib end defining a lateral rib span from the pressure and to the suction side of the airfoil section, the radial notch defining a lateral notch span between shoulder apexes of the first and second shoulders, and the lateral notch span is 40% to 70% of the lateral rib span.

13. The gas turbine engine as recited in claim 12, wherein the rib has another radial rib end at the second radial end of the airfoil section, the rib defines a radial rib span between a shoulder apex of one of the first or second shoulders and the radial rib end at the second radial end of the airfoil section, the radial notch defines a radial notch span between the shoulder apex and a radial nadir of the radial notch, and the radial notch span is 1% to 10% of the radial rib span.

14. The gas turbine engine as recited in claim 12, wherein the rib has another radial rib end at the second radial end of the airfoil section, the first and second shoulders defines shoulder apexes, the rib defines a radial rib span between one of the shoulder apexes and the radial rib end at the second radial end of the airfoil section, the radial notch defines a radial notch span between the one of the shoulder apexes and a radial nadir of the radial notch, the rib at the radial rib end defines a lateral rib span between the pressure and suction sides of the airfoil section, the radial notch defines a lateral notch span between the shoulder apexes of the first and second shoulders, and the lateral notch span is greater than the radial notch span.

15. The gas turbine engine as recited in claim 12, wherein the radial notch has a radial nadir and curved sides that extend from the radial nadir.

16. The gas turbine engine as recited in claim 12, wherein the radial notch has a cross-section that is substantially a hyperbola.

17. The gas turbine engine as recited in claim 12, wherein the airfoil fairing has first and second fairing platforms also formed by the fiber-reinforced composite wall, and the airfoil section extends between the first and second fairing platforms.

18. The gas turbine engine as recited in claim 17, wherein the fiber-reinforced composite wall is ceramic matrix composite.

19. The gas turbine engine as recited in claim 12, wherein the rib has another radial rib end at the second radial end of the airfoil section, the rib defines a radial rib span between a shoulder apex of one of the first or second shoulders and the radial rib end at the second radial end of the airfoil section, the radial notch defines a radial notch span between the shoulder apex and a radial nadir of the radial notch, the radial notch span is 1% to 10% of the radial rib span, the rib at the radial rib end defines a lateral rib span between the pressure and suction sides of the airfoil section, the radial notch defines a lateral notch span between shoulder apexes of the first and second shoulders, and the lateral notch span is 40% to 70% of the lateral rib span.

20. The gas turbine engine as recited in claim 12, wherein the rib has another radial rib end at the second radial end of the airfoil section, the rib defines a radial rib span between a shoulder apex of one of the first or second shoulders and the radial rib end at the second radial end of the airfoil section, the rib at the radial rib end defines a lateral rib span between the pressure and suction sides of the airfoil section, the radial notch defines a lateral notch span between shoulder apexes of the first and second shoulders, and an aspect ratio of the lateral notch span to the radial rib span is from 1:1 to 4:1.

21. The gas turbine engine as recited in claim 12, wherein each of the apexes is defined at a farthest perpendicular distance from a reference line that intersects the respective first or second shoulder at the pressure side or the suction side and that is tangent to the radial notch.

* * * * *